United States Patent [19]

Hansen

[11] Patent Number: 4,490,659
[45] Date of Patent: Dec. 25, 1984

[54] VOLTAGE CONTROLLED, VARIABLE TIME DELAY ELECTRONIC INTERVAL TIMER FOR MOTOR CONTROL

[75] Inventor: James E. Hansen, Oak Creek, Wis.

[73] Assignee: Eaton Corporation, Cleveland, Ohio

[21] Appl. No.: 540,738

[22] Filed: Oct. 11, 1983

[51] Int. Cl.³ .................. G05D 3/10; G01C 21/18; H01H 43/00

[52] U.S. Cl. .................... 318/484; 318/649; 361/189; 361/195; 361/197

[58] Field of Search ............ 318/649, 484, 486, 487, 318/452; 361/187, 195–197, 198, 199; 307/141.4, 141.8, 597, 598

[56] References Cited

U.S. PATENT DOCUMENTS

| | | | |
|---|---|---|---|
| 2,871,419 | 1/1959 | Brosh | 361/187 |
| 3,431,471 | 3/1969 | Aviander | 361/196 |
| 3,435,298 | 3/1969 | Atkins et al. | 318/484 X |
| 3,644,793 | 2/1972 | Ilk | 361/198 |
| 3,671,817 | 6/1972 | Seipp | 361/198 |
| 4,107,588 | 8/1978 | Seiler | 318/484 |
| 4,199,808 | 4/1980 | Peterson | 361/195 X |

FOREIGN PATENT DOCUMENTS

| | | | |
|---|---|---|---|
| 2310767 | 3/1972 | Fed. Rep. of Germany | 318/649 |
| 114907 | 7/1982 | Japan | 318/649 |

Primary Examiner—J. V. Truhe
Assistant Examiner—Bentsu Ro
Attorney, Agent, or Firm—C. H. Grace; W. A. Autio

[57] ABSTRACT

A pair of interval timer units including a lower right timer (LRT) and a lower left timer (LLT) for controlling a pair of D.C. motors (RM, LM) to drive a pair of load devices accurately and consistently a predetermined lowering distance. The load devices are raised together until stopped by limit switches (LS1, LS2) but can be lowered individually under the interval timer (IT) control. Each timer unit (LRT) includes a voltage regulator (ZD1, ZR1) to provide a constant voltage to a ramp voltage generator (RG) and a reference voltage to a voltage inverter (VI). The ramp voltage is applied through a buffer (IC1B) to one input of a comparator (IC1C). The variable supply voltage is also applied to the voltage inverter (VI) that provides a time reference voltage that varies inversely with respect to variation in the supply voltage. This time reference voltage is applied to the comparator (IC1C) upon closure of a "lower" switch to close a motor control switch (Q3) to start the motor time interval and when the ramp voltage rises to the level of the time reference voltage, the comparator (IC1C) opens the motor control switch (Q3) to stop the motor time interval. As a result, since the motor speed changes with change in supply voltage, the interval timer varies inversely the motor operating time for constant load driving distance.

9 Claims, 3 Drawing Figures

VOLTAGE CONTROLLED, VARIABLE TIME DELAY ELECTRONIC INTERVAL TIMER FOR MOTOR CONTROL

BACKGROUND OF THE INVENTION

Variable time delay timers have been known heretofore. For example, A. Brosh U.S. Pat. No. 2,871,419, dated Jan. 27, 1959, shows a variable time delay circuit of the on-delay type that provides a time delay before the energization of a relay that is inversely dependent upon the strength of an incoming carrier signal. This patented circuit has an output voltage characteristic that includes a step voltage pedestal portion and an RC timed ramp portion, the latter being inversely proportional to the strength of an incoming carrier signal. This patented timer is controlled by a noise level input, the stronger the carrier signal the lower the noise level input. Also, the lower the noise level, the higher the pedestal on the voltage characteristic and, therefore, the shorter the time interval that is generated prior to energization of the relay. S. Aviander U.S. Pat. No. 3,431,471, dated Mar. 4, 1969, relates to a static time delay relay that improves the accuracy of the tripping time of the relay by means of a steeper RC circuit voltage slope by maintaining the charging voltage above the capacitor voltage. W. H. Seipp U.S. Pat. No. 3,671,817, dated June 20, 1972, shows a high accuracy solid state timer using an operational amplifier connected as a comparator and having an RC charging network voltage applied to one input of the comparator while an adjustable potentiometer provides a settable comparison voltage, according to the length of time desired, to the other input of the comparator. Thus, the potentiometer may be manually adjusted for selecting the desired length of the time interval. An output relay is energized at the end of the timed interval.

While these prior patented timer systems have been useful for their intended purposes, this invention relates to improvements thereover.

SUMMARY OF THE INVENTION

An object of the invention is to provide an improved voltage controlled, variable time delay electronic interval timer for motor control.

A more specific object of the invention is to provide an improved voltage dependent interval timer.

Another specific object of the invention is to provide a precision, electronic interval timer having a linear voltage versus time function and a timer interval inversely proportional to a supply reference voltage.

Another object of the invention is to provide an improved motor control system using a supply voltage dependent interval timer that will always drive a load the same distance regardless of variations in the supply voltage.

Another object of the invention is to provide an improved dual motor control system using a pair of voltage dependent timers for driving a pair of loads repeatedly the same distances either individually or simultaneously.

Other objects and advantages of the invention will hereinafter appear.

BRIEF DESCRIPTION OF DRAWINGS

FIG. 3 is a graph showing operating characteristics of each of the timer units of FIG. 2.

DESCRIPTION OF THE PREFERRED EMBODIMENT

Figure 1:
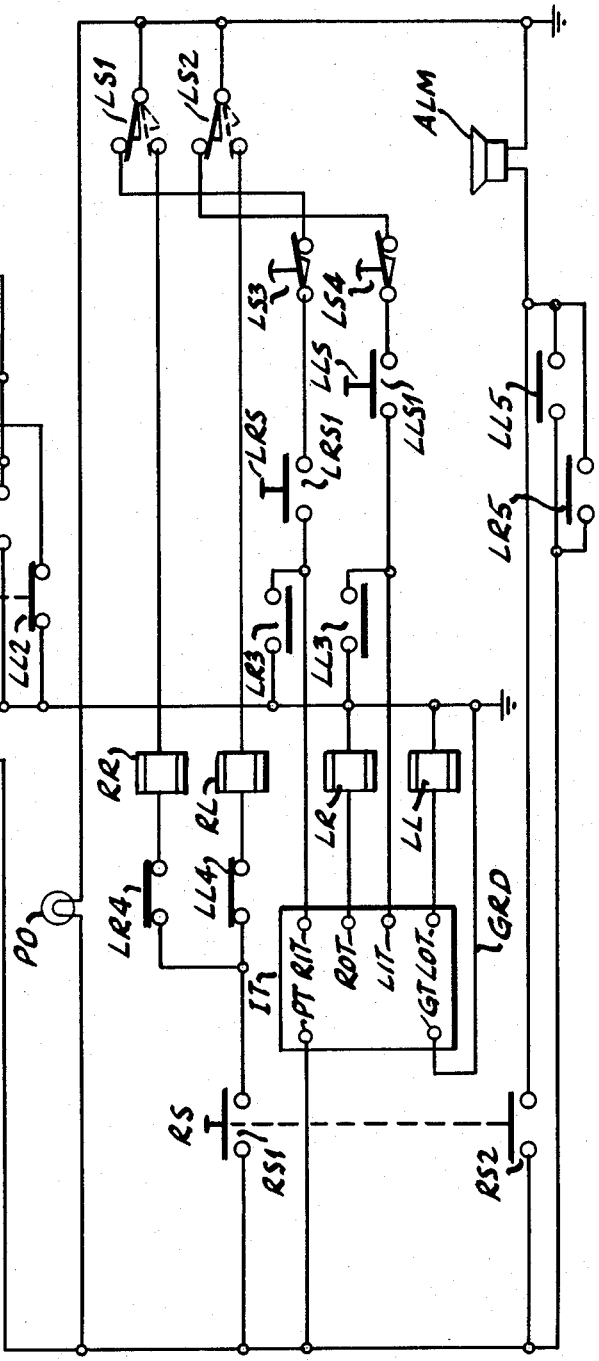
FIG. 1 is a circuit diagram showing partly schematically and partly diagramatically application of the invention to a dual motor control system.
Figure 2:
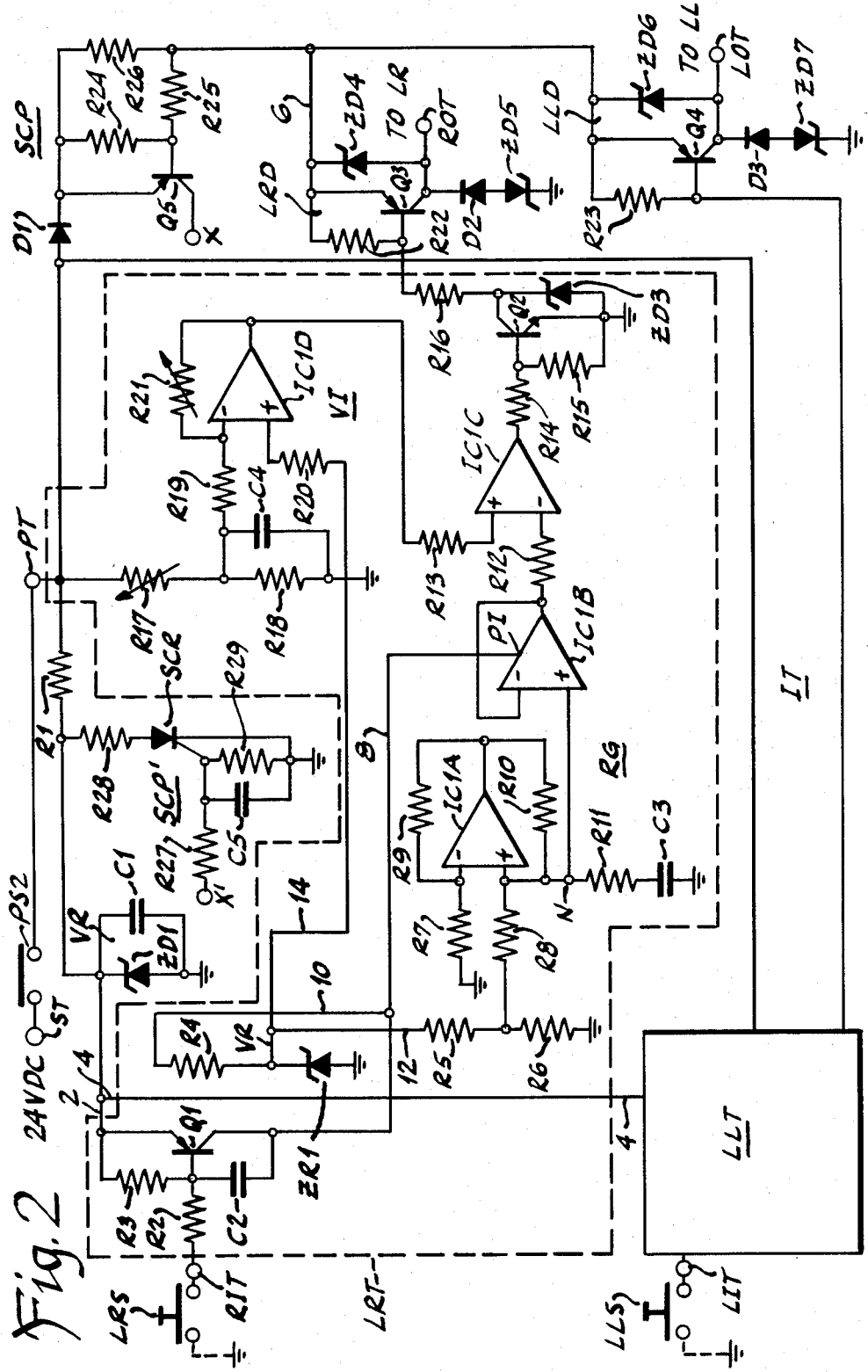
FIG. 2 is a circuit diagram showing a voltage controlled, variable time delay electronic interval timer for motor control including two timer units for operating respective motor control relays.

Referring to FIG. 1, there is shown a dual motor control system to which the interval timer IT of FIG. 2 may be applied. Referring to FIG. 1, there are shown a pair of D.C. motors represented by their armatures, including a right motor RM and a left motor LM, the field which may be a permanent magnet type or the like being omitted to avoid complicating the drawing. These motors are characterized as right and left motors because a practical application is for lowering and raising right and left "spade" devices on the rear, or trail, of a field piece or gun carrier vehicle. As shown in FIG. 1, right motor RM may be energized to run in the lowering direction from a 24 volt D.C. supply at supply terminal ST through normally-open contact PS1 of an on-off power switch PS, normally-open contact LR1 of a lower relay LR and normally-closed contact RR2 of a raise relay RR to ground, the voltage magnitude of this D.C. supply being subject to variation. Alternatively, right motor RM may be energized to the raising direction from the 24 volt D.C. supply at supply terminal ST through power switch contact PS1, normally-open contact RR1 of raise relay RR and normally-closed contact LR2 of lower relay LR to ground.

In a similar manner, left motor LM may be energized to run in the lowering direction from the 24 volt D.C. supply at supply terminal ST through normally-open contact PS2 of power switch PS, normally-open contact LL1 or lower left relay LL and normally-closed contact RL2 of raise left relay RL to ground. Alternatively, left motor LM may be energized to run in the raising direction from the 24 volt D.C. supply at supply terminal ST through power switch contact PS2, normally-open contact RL1 of raise left relay RL and normally-closed contact LL2 of lower left relay LL to ground. The manner in which right and left raise relays RR and RL and right and left lower relays LR and LL are energized will now be described. It will be apparent that switch RS is a raise switch under the control of which both right and left raise relays RR and RL may be energized simultaneously. On the other hand, switch LRS is a lower right switch and switch LLS is a lower left switch under the control of which lower right relay LR and lower left relay LL, respectively, are energized. Limit switches LS1 and LS2 are controlled by the movement of the loads driven by right motor RM and left motor LM, respectively, and are shown in FIG. 1 in the positions to which they are actuated at the end of the raise movements of the loads. In view of the positions of limit switches LS1 and LS2 as shown in FIG. 1, it will be apparent that the spades driven by the two motors are in their uppermost positions. Limit switches LS3 and LS4 are shown in FIG. 1 in the positions to which they are actuated by the respective loads when these loads are in their utmost top positions, these switches also being manually operable. As soon as the loads driven by the motors leave their utmost top positions, limit switches LS3 and LS4 open. At that time, the lowering operations will have been placed under the control of lower right and lower left relays LR and LL, respectively. As the description proceeds, it will become apparent that the immediate opening of limit switches LS3 and LS4 as soon as the loads driven by the motors leave their utmost top positions will prevent the lowering functions from being initiated by manual switches LRS and LLS if the motor loads are in intermediate positions as a safety device. Since the lowering of the load devices or spades is time controlled, this of course prevents over-driving of the same.

A typical operation of the system of FIG. 1 is as follows. For this purpose, it may be assumed that the loads (spades) driven by motors RM and LM are in their fully raised positions as indicated by the positions of limit switches LS1-LS4 shown at the right-hand portion of FIG. 1. Initially, power is applied to the system by depressing power switch PS and closing its contacts PS1 and PS2 thereby to apply power from the 24 volt D.C. source at supply terminal ST to power terminal PT of interval timer IT. Ground is connected through conductor GRD to ground terminal GT of interval timer IT as shown in FIG. 1. This application of power to the system causes illumination of power-on indicator lamp PO from supply terminal ST through power switch contact PS2 to ground thereby indicating that electrical power has been applied to the system. To initiate lowering of the right spade, lower right switch LRS is closed. To initiate lowering of the left spade, lower left switch LLS is closed. Or to initiate lowering of both the right and left spade simultaneously, switches LRS and LLS are closed at the same time. Closure of lower right switch LRS causes application of ground through limit switches LS1 and LS3 to right input terminal RIT of interval timer IT. As a result, timer IT operates and applies a voltage from its right output terminal ROT to cause energization of lower right relay LR for a predetermined time interval. The details of an operation of interval timer IT will subsequently be described in connection with FIG. 2 and the graph shown in FIG. 3. For the present, a general description of its operation will suffice. Relay LR, when so energized, closes its contact LR to start right motor RM operating in a circuit extending from supply terminal ST through power switch contact PS1 and normally-closed raise right relay RR contact RR2 to ground. Relay LR also opens its interlocking contact LR2 to prevent reverse energization of motor RM. Relay LR also closes its contact LR3 to establish a maintaining circuit for its own energization in shunt of manual switch LRS and limit switches LS3 and LS1. In addition, relay LR opens its normally-closed contact LR4 to prevent concurrent energization of raise relay RR, and closes its normally-open contact LR5 to energize alarm ALM. Consequently manual switch LRS may now be released to allow it to reopen without affecting the continued operation of right motor RM because the maintenance of energization of lower right relay LR has now been placed under the control of interval timer IT. It will be apparent from FIG. 1 that when lower right relay LR was energized, its contact LR5 was closed to energize alarm ALM as an audible warning signal to indicate that right motor RM is driving its load. Interval timer IT now maintains relay LR energized and motor RM operating to drive the right spade the predetermined distance, shifting limit switch LS1, whereafter interval timer IT deenergizes relay LR and stops the right motor.

In a similar manner, depressing lower left switch LLS causes lowering of the left spade as follows. Contacts LLS1 of this manual switch close to apply ground through limit switches LS2 and LS4 to left input terminal LIT of interval timer IT. As a result, timer IT applies a voltage from its lower output terminal LOT to energize lower left relay LL. Relay LL closes its contact LL1 to energize left motor LM from supply terminal ST through power switch contact PS2 and interlocking contact RL2 of raise left relay RL to ground. Relay LL also opens its interlocking contact LL2 to prevent reverse energization of left motor LM, closes its contact LL3 to maintain relay LL energized in shunt of contact LLS1 of manual switch LLS and limit switches LS4 and LS2, opens its contact LL4 to prevent simultaneous energization of raise left relay RL, and closes its contact LL5 to energize alarm ALM. As a result, the energization of relay LL and the operation of motor LM have been placed under the control of interval timer IT which times the lowering of the left spade and then stops it. In connection with the aforedescribed lowering of both the right spade and the left spade it will be apparent that as soon as the lowering starts, respective limit switches LS3 and LS4 open. This prevents initiation of another lowering function from manual switches LRS and LLS in the event the spades should stop at some intermediate point. When the right and left spades reach the end of their lowering movements, limit switches LS1 and LS2, respectively, are actuated to their dotted line positions shown in FIG. 1. As a result, limit switches LS1 and LS2 prepare circuits for energization of raise right relay RR and raise left relay RL under the control of manual raise switch RS.

When switch RS is depressed, its contact RS1 closes to energize both raise right relay RR and raise left relay RL through contacts LR4 and LL4 and limit switches LS1 and LS2, respectively, to ground. Raise relay RR closes its contact RR1 to complete a circuit from supply terminal ST through power switch contact PS1, right motor RM and contact LR2 to ground to energize the right motor. Relay RR also opens its contact RR2 to prevent reverse energization of motor RM. In a similar manner, raise left relay RL closes its contact RL1 to energize left motor LM from supply terminal ST through power switch contact PS2 and contact LL2 to ground. As a result motors RM and LM run and raise the spades to their uppermost positions. When raise switch RS was depressed as aforesaid, its contact RS2 closes to energize alarm ALM for the purposes hereinbefore described. Raise switch RS is held depressed during the time that the spades are being raised. When the spades reach their uppermost positions, limit switches LS1 and LS2 are operated by mechanical means or the like to their solid line positions shown in FIG. 1 to prepare operating circuits for lower relays LR and LL. Also, when the spades reach their utmost raised positions, limit switches LS3 and LS4 close to enable the two lowering circuits.

The operation of interval timer IT shown as a rectangle in FIG. 1 will now be described in connection with FIG. 2 where it is shown in much more detail. With the exception of lower right switch LRS and lower left switch LLS, supply terminal ST and power switch contact PS2 the circuit shown in FIG. 2 is enclosed within interval timer rectangle IT in FIG. 1. The terminals shown within the rectangle IT in FIG. 1 are also shown in FIG. 2, that is, power terminal PT is shown at the upper central portion of FIG. 2, raise input terminal RIT is shown at the upper left-hand portion of FIG. 2, lower input terminal LIT is shown at the lower left-hand portion of FIG. 2, right output terminal ROT is shown at the right central portion of FIG. 2 and left output terminal LOT is shown at the right lower portion of FIG. 2. Ground terminal GT within the rectangle IT in FIG. 1 is represented in FIG. 2 by the several ground symbol connections at various points in the circuit.

Interval timer IT in FIG. 2 comprises two generally similar timer units including a lower right timer unit LRT and a lower left timer unit LLT. Since lower left timer unit LLT is similar to lower right timer unit LRT, it has been shown schematically as a rectangle to avoid complicating the drawing. Supply voltage is applied from a 24 volt D.C. source at supply terminal ST through power switch contact PS2 to power terminal PT as described in connection with FIG. 1 and then from power terminal PT through a common voltage regulator VR and in a first branch through conductor 2 to lower right timer unit LRT and in a second branch through conductor 4 to lower left timer unit LLT. Voltage regulator VR comprises a series resistor R1, a capacitor C1 and a zener diode ZD1. Also common to the two timer units LRT and LLT is a short circuit protection network shown partly at two locations as SCP and SCP', the operation of which will be hereinafter described.

To operate lower right timer unit LRT, a ground signal is applied under the control of lower right switch LRS to its right input terminal RIT as described in connection with FIG. 1 to cause it to provide a positive voltage signal at its right output terminal ROT for a predetermined length of time long enough to lower the right spade to the predetermined extent. For this purpose, power is also applied from power terminal PT through diode D1 and conductor 6 to the relay LR coil driver circuit LRD which supplies voltage to right output terminal ROT.

Whenever right input terminal RIT is switched to ground by a command to lower the winch of the right spade as by closing lower right switch LRS, PNP transistor Q1 is turned on, causing the following to occur: the collector of transistor Q1 supplies voltage from voltage regulator ZD1 through conductor 8 to the power input PI of quad op-amp IC1A-D of the LM124 type or the like. The conductor 8 connection to power input PI of op-amp IC1B also represents similar power inputs to the other three op-amp integrated circuits IC1A, IC1C and IC1D on the same IC. The collector of transistor Q1 also supplies voltage from voltage regulator ZD1 through conductor 10 and resistor R4 voltage reference zener reference ZR1 such as an LM129C or the like. ZR1 is a precision voltage reference element with excellent current and temperature range capability. This provides much better voltage regulation than the main regulator zener diode ZD1. The consequent precision stable reference voltage VR on conductors 12 and 14 is used to control the precision voltage ramp generator RG and as a reference voltage in the system voltage sensing function of voltage inverter VI. How this ramp generator RG and voltage inverter VI function will be described hereinafter. In voltage ramp generator RG, the op-amp IC1A circuit is used as a voltage-to-current converter or a precision constant current circuit supplying op-amp IC1B which is used as a buffer. Op-amp IC1C, used as a comparator, is initially biased such that its output is high, biasing on the base of NPN transistor Q2 and accordingly switching its collector low. This, in turn, turns on PNP transistor Q3 by supplying base current through resistor R16. The collector of transistor Q3 now supplies current through right output terminal ROT to the coil of lower right relay LR energizing such relay as hereinbefore described in connection with FIG. 1. To summarize, when right input terminal RIT is grounded, right output terminal ROT goes high, turning on power relay LR which supplies current to right winch motor RM. At the same time as operation of motor RM is initiated, ramp generator RG begins to operate. The circuit of op-amp IC1A including resistors R7-R10 comprises a precision constant current circuit or a voltage-to-current converter.

Various types of constant current sources have been known and investigated but most of them have been found to present one type of problem or another. Temperature susceptibility has been especially troublesome. Other problems encountered have been voltage sensitivity, initial conditions of start-up problems, interface problems, suitable current operating level and the like.

The most stable current source circuit for the low current required in the timer of this invention was found to be based on the "Howland" type circuit which uses an operational amplifier and precision resistors and is described on pages 155–159 of *Modern Operational Circuit Design* by John I. Smith, Wiley-Interscience, a division of John Wiley & Sons, Inc., 1971. A low current is required to enable use of a small temperature stable metallized polycarbonate or other film type capacitor C3 or the like. The node N between resistor R10 and the noninverting input of op-amp IC1A supplies a ramp circuit comprising resistor R11 and capacitor C3. The constant current flowing through resistor R11 into capacitor C3 is essentially determined by the voltage at the junction between resistors R5 and R6 divided by the value of resistor R8. This current is very stable since the voltage is sourced by the precision zener reference ZR1 and all of the resistors in the divider R5–R6 and the Howland circuit are stable type. Resistor R11 is a relatively small resistor. Its purpose is to limit capacitor C3 discharge current into the non-inverting input terminal of op-amp IC1A when main power is removed therefrom. This resistor R11 is small enough so that it does not disturb the linearity of charging of capacitor C3. It appears that when supply voltage is removed from the op-amp, the inputs become relatively low impedance to ground. The op-amps are used as single-ended, that is, with a single supply with respect to ground rather than the more general forms with plus and minus supplies. Resistor R11 limits discharge current from capacitor C3 from damaging the input of op-amp IC1A. One benefit of the low input impedance of the unpowered op-amp is that when power is removed, capacitor C3 will discharge relatively quickly, permitting an effectively fast reset capability of the timer. Capacitor C3 is consequently charged linearly and predictably over a period of time chosen to be slightly longer than the longest time the timer must operate. As a result, the voltage appearing at node N is a linear ramp voltage. The ramp voltage appearing at node N is then fed to the input of another op-amp section IC1B buffer which is connected as a source follower such that the input impedance is very high and which will, therefore, not load the capacitor C3 charging circuit which otherwise would disturb the ramp shape or linearity. The output of op-amp buffer IC1B, therefore, represents a buffered copy of the ramp voltage. The buffer is used although it may not be absolutely necessary as the signal is fed to a high gain comparator at the inverting input of op-amp IC1C.

Now that a precise ramp voltage is fed to the inverting input of comparator IC1C, in order that the output interval of the timer shall be inversely proportional to any variation in the supply voltage which is supplied to the motor, it is necessary to adjust the reference voltage that is applied to the noninverting input of comparator IC1C so that it will vary as a function of the sensed system voltage. Since the time interval of the timer should become shorter as the system voltage goes up running the motor faster, it is necessary to invert the sensed system voltage signal changes. This is accomplished by the voltage inverter circuit surrounding op-amp section IC1D. System voltage, that is, voltage supplied to the winch motors, is sensed at power terminal PT. This voltage is divided by resistors R17 and R18 and is supplied through resistor R19 into the inverting input of op-amp IC1D which is configured as a voltage inverter. The sampled voltage at the inverting input of op-amp IC1D is compared to the precision reference voltage coming through resistor R20 from zener reference ZR1 to the noninverting input of op-amp IC1D. The resistor values and ratios of the inverting circuit VI are selected such that the output voltage of the inverting op-amp IC1D will follow a desired output voltage versus sensed system voltage curve which is actually a linear relationship which, when fed to the reference voltage noninverting input of comparator IC1C, will adjust the comparator output toggle point to vary precisely to provide the desired linear time changes on the ramp voltage curve coming from buffer IC1B.

Reference to the graph in FIG. 3 will illustrate the operation of the timer unit. The output of buffer IC1B is shown in FIG. 3(a) as a linear ramp RMP and the reference voltage coming from the output of voltage inverter VI is on the vertical or Y-axis in FIG. 3(a). Time is shown on the horizontal or X-axis of the graph in FIG. 3(a) The ramp voltage and the reference voltage are applied to the two inputs of comparator IC1C in FIG. 2. Since the ramp voltage remains constant, it will be apparent that a linear time change can result if the reference voltage input to the comparator is adjusted in linear voltage increments as shown by broken lines A, B and C in FIG. 3(a). More specifically, assuming that the reference voltage initially has a value B, an elapsed time E will take place before comparator IC1C provides an output to terminate the time interval. Now, if the supply voltage that is applied to power terminal PT and also to the motor LM should rise in value from B' to C' in FIG. 3(b), the output of voltage inverter op-amp IC1D will decrease to a reference voltage value C as shown in FIG. 3(a), causing the time that the lower motor LM runs to decrease to a time interval F. Because the supply voltage has increased in value running the motor faster, it takes less time F for the motor to extend its spade the required distance. On the other hand, if the supply voltage should decrease from B' to A' FIG. 3(b), running the motor slower, the output of the voltage inverter that supplies the reference voltage to the comparator increases to the value A shown in FIG. 3(a), causing the time interval that the lower motor LM will run to be lengthened to the value D as shown in FIG. 3(a).

FIG. 3(b) illustrates the effect of the voltage inverter VI. Three linear curves G, H and I are shown in this graph as examples. Considering curve G initially, it shows that for a specific amplifier gain at op-amp IC1D, which gain is determined by the values of resistor R21 and the "Theveninized" (Thevenin Theorem) input resistance of resistors R17, R18 and R19, a given response can occur. That is, curve G shows that the output of op-amp IC1D which is the reference voltage for comparator IC1C decreases at a given rate in response to increase in the supply voltage. Curve H shows a response to substantially the same gain but which is shifted downward somewhat and which is basically achieved by the ratio of the resistances of resistors R17 and R19 as by adjusting resistor R17. Curve I shows how the slope can be changed by altering the gain of the voltage inverter VI amplifier configuration as by adjusting resistor R21. Thus, by utilizing a desired gain (slope) and offset level, it is possible to adjust the output of op-amp IC1D to vary inversely with respect to sensed system voltage changes. This signal, when applied to the comparator reference input, the noninverting input of op-amp IC1C, and compared to the fixed ramp voltage versus time supplied to the inverting input of op-amp IC1C can produce a time delay characteristic which will produce the desired results. In the circuit of FIG. 2, once the comparator IC1C toggles, the relay LR coil driver circuit at transistor Q3 deenergizes the relay which in turn unlatches at its contact LR3 the interlocked control signal to the base of transistor Q1 as shown in FIG. 1, ending the time sequence as well as terminating power to the winch motor by opening contact LR1. More specifically with reference to FIG. 2, it will be apparent that during the timing interval the reference voltage is of higher magnitude than the ramp voltage at the inputs of comparator IC1C. Consequently, the output of comparator IC1C will be high and keeps transistor Q2 conducting which, in turn, keeps transistor Q3 conducting to energize relay LR. At the end of the time interval, when the ramp voltage reaches and exceeds the reference voltage as illustrated in FIG. 3(a), the output of comparator IC1C goes low, thereby turning off transistor Q2 which in turn turns off transistor Q3 and deenergizes relay LR.

Lower left timer LLT controls lower left relay LL through the intermediary of driver transistor Q4 in the same manner as hereinbefore described in connection with lower right timer LRT and driver transistor Q3.

Additional circuitry shown in FIG. 2 includes the PNP transistor Q5 shown at the upper right-hand portion of FIG. 2 which forms a current sensor circuit which, if biased on by an excessive coil load current through sensing resistor R26, will switch a signal to the gate of silicon controlled rectifier SCR, shown at the upper right-hand portion of FIG. 2, rendering it conducting and thereby interrupting and latching off circuit supply current and thus turning off the coil drive transistor circuits of transistors Q3 and Q4. For this purpose, it will be apparent that the terminal X at the collector of transistor Q5 of the first part of short circuit protector network SCP is in actual practice connected to terminal X' which leads through resistor R27 to the gate of the SCR of the second part of short circuit protector network SCP'. If, for example, a coil circuit which is external to the unit is somehow shorted out, the short circuit protector network will sense this condition and turn off the driver circuits to protect the output transistors. Reset of the system requires removal of power from power terminal PT to unlatch or render nonconducting the SCR and followed by reapplication of power to terminal PT. It will be apparent that the single short circuit protector network is used to provide protection for either or both timer units LRT and LLT.

While the apparatus hereinbefore described is effectively adapted to fulfill the objects stated, it is to be understood that the invention is not intended to be confined to the particular preferred embodiment of voltage controlled, variable time delay electronic interval timer for motor control disclosed, inasmuch as it is susceptible of various modifications without departing from the scope of the appended claims.

I claim:

1. In a motor control system having at least one motor for driving a load device accurately and consistently a predetermined distance, the improvement comprising:
   an electrical supply source supplying operating voltage to the motor and having a voltage magnitude subject to variation so as to vary the motor speed;
   output control means supplied from said source for energizing the motor;
   an interval timer supplied from said source for controlling said output control means for a time interval that has a variable length inversely proportional to said variation in the magnitude of the supply voltage;
   control means for initiating operation of said timer;
   means responsive to said timer upon initiation of operation thereof for controlling said output control means to energize the motor so as to start driving the load device;
   said interval timer comprising:
   means comprising a voltage regulator supplied from said source and responsive to initiation of operation of said timer for providing a constant reference voltage;
   means comprising a precision constant current circuit responsive to said reference voltage for providing a linear ramp voltage;
   means comprising a voltage inverter circuit responsive to said reference voltage and the supply voltage for providing a time reference voltage that varies as an inverse function of said variation in the magnitude of the supply voltage;
   and means comprising a comparator responsive to said ramp voltage and said time reference voltage for controlling said output control means to stop the motor at the end of a time interval dependent on the magnitude of the supply voltage so as to drive the load device consistently and accurately the same distance each time regardless of any variation in the supply voltage.

2. In the motor control system as claimed in claim 1, wherein:
   said voltage inverter circuit comprises an operational amplifier and means for adjusting the gain of said operational amplifier so as to vary the amount of change in said time interval for a given change in the magntiude of said supply voltage thereby to adapt said interval timer for control of different types of electrical motors.

3. In the motor control system as claimed in claim 1, wherein:
   said voltage inverter circuit comprises an operational amplifier and means for adjusting the input thereto from said supply voltage so as to control the value of said time reference voltage for a normal value of supply voltage.

4. In a motor control system as claimed in claim 1, wherein:
   said means comprising a precision constant current circuit comprises a capacitor network responsive to the constant current from said precision constant current circuit for providing said linear voltage ramp.

5. In a motor control system as claimed in claim 1, wherein:
   said means comprising a voltage regulator and said means comprising a precision constant current circuit comprise means for presetting said linear voltage ramp to be longer in duration than the maximum time interval required for the motor to drive the load device said predetermined distance.

6. An interval timer comprising:
   a direct current power supply source;
   means supplied from said source for providing a controlled reference voltage;
   a voltage ramp generator comprising a precision circuit responsive to said reference voltage for providing a constant current and a capacitor network responsive to said constant current for providing a linear ramp voltage;
   time reference means comprising adjustable means controlled by said source and said reference voltage for providing an adjustable time reference voltage;
   comparator means responsive to said time reference voltage for providing an output signal to initiate a time interval and being responsive to said linear ramp voltage reaching and exceeding said time reference voltage for terminating said output signal to terminate said time interval;
   and adjustment of said adjustable means effecting corresponding adjustment of said time reference voltage thereby to adjust the length of said time interval.

7. In a motor control system having a pair of reversible motors for driving respective load devices accurately and consistently a predetermined distance, the improvement comprising:
   a D.C. supply source supplying operating voltage to the motors and having a voltage magnitude subject to variation so as to vary the speeds of the motors;
   and control means for the motors comprising:
   output switching means supplied from said source for energizing each of said motors;
   an interval timer for each motor supplied from said source for controlling the respective output switching means so as to energize the motors in one direction for a time interval that has a variable length inversely proportional to the variation in magnitude of the supply voltage;
   means for initiating operation of said timer and at the same time controlling said output switching means to energize the motors so as to start driving their load devices;
   each said interval timer comprising:
   means supplied from said source for providing a constant reference voltage;
   a voltage ramp generator comprising a precision circuit responsive to said reference voltage for providing a constant current and a capacitor network responsive to said constant current for providing a linear ramp voltage;

time reference means controlled by said reference voltage and said supply voltage for providing a time reference voltage as an inverse function of variation in the supply voltage;

and a comparator responsive to said ramp voltage reaching a predetermined level relative to said time reference voltage for controlling said output switching means to stop the motor.

8. In a motor control system as claimed in claim 7, wherein:

said time reference means comprises means for controlling the magnitude of said time reference voltage relative to the value of the supply voltage thereby to control the time interval of said timer.

9. In a motor control system claimed in claim 7, wherein:

said time reference means comprises means for controlling the gain in the value of said time reference voltage relative to the variation in the supply voltage thereby to control the change in said time interval with respect to the variation in the supply voltage.

* * * * *